No. 768,568.

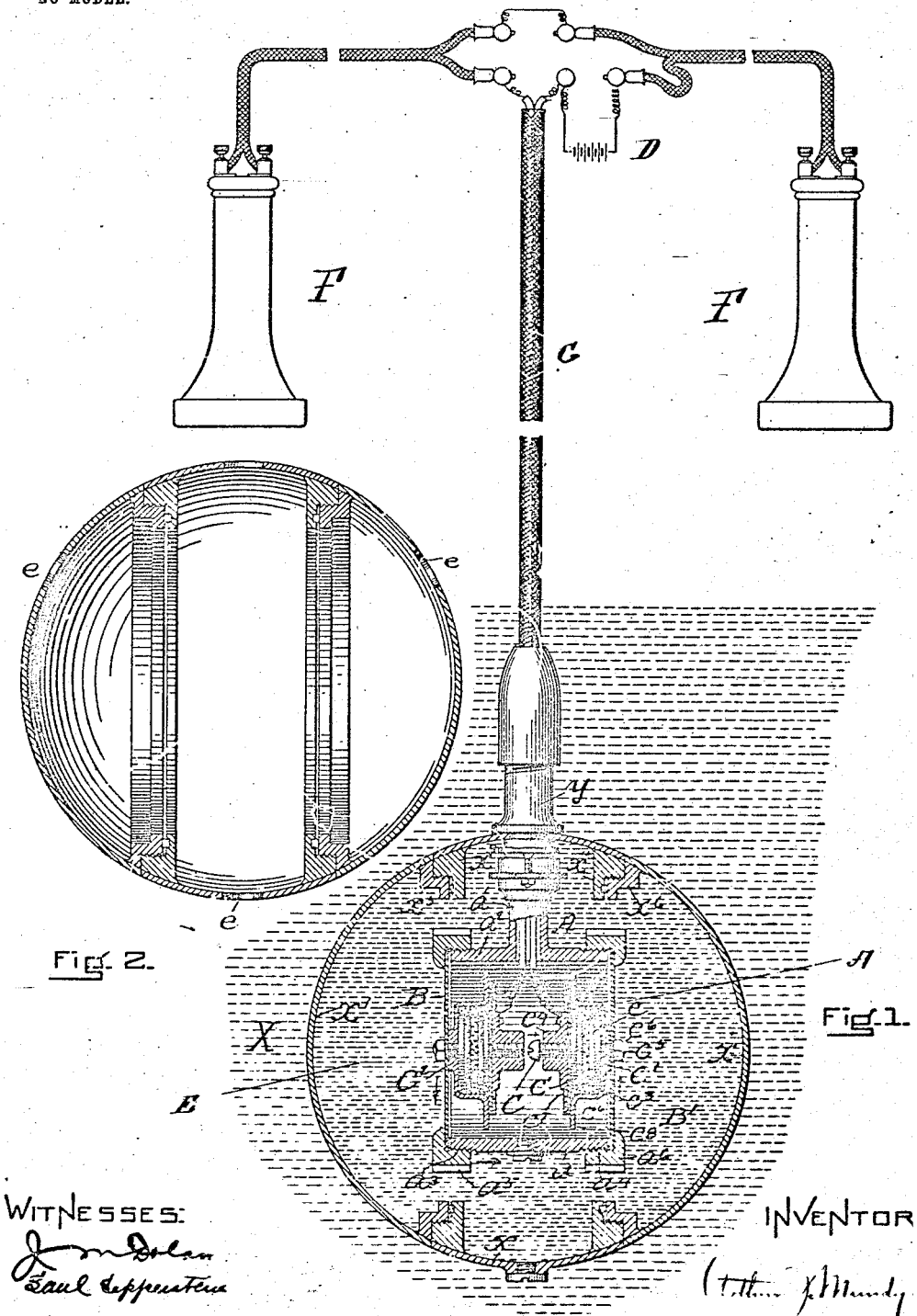

Patented August

UNITED STATES PATENT OFFIC

ARTHUR J. MUNDY, OF BOSTON, MASSACHUSETTS, ASSIGNOR TC RINE SIGNAL COMPANY, OF WATERVILLE, MAINE, A CORP OF MAINE.

SOUND TRANSMITTER AND RECEIVER.

SPECIFICATION forming part of Letters Patent No. 768,568, dated August 23,

Application filed April 23, 1902. Serial No. 104,297. (No model.)

*To all whom it may concern:*

Be it known that I, ARTHUR J. MUNDY, a citizen of the United States, and a resident of Boston, in the county of Suffolk and State of Massachusetts, have invented a new and useful Improvement in Sound Receivers and Transmitters, of which the following is a full, clear, and exact description, reference being had to the accompanying drawings, forming a part of this specification, in explaining its nature.

My present invention is another embodiment of the invention of my copending application Serial No. 104,299, said application being limited in accordance with the Patent Office requirements to a broad invention and one embodiment thereof. The broad invention of my said copending application relates to a means for preserving a continuity of similar medium between a sending means and the diaphragm of the receiving-transmitter, while at the same time maintaining said transmitter inclosed from the outer water. The specific embodiment of the invention set forth and claimed in said application is the use of a ship or similar structure itself or a portion thereof as the inclosing casing and the side of said ship or structure as the protecting wall of such casing.

My present invention relates to a device comprising a case or shell containing a medium similar in nature to the outer water and having suitably mounted therein a transmitter of a character to be presently described. The relative position of the receiver, the inclosed medium, and the outer water is that disclosed and claimed in my aforesaid copending application, and, similarly, an object of my present device is to maintain a continuity of the transmitting medium between the sound-producing means and the transmitter, to avoid the disadvantage of an exposure of the transmitter to the open sea, and to secure all the advantages inherent to a proper insulation of said diaphragms from the outer elements.

A further object of this invention is the production of an electrical transmitter peculiarly adapted to operate in conta inclosed liquid of the submerged In order to secure the reliable o an electrical transmitter, it is ne maintain the resistance-varying from moisture. Otherwise prope insulation is not secured, and the a resistance-varying means may, m seriously impaired. It is equally however, in submarine signaling tl phragm of the transmitter be in act with the transmitting medium its a medium similar in nature there invention, as will hereinafter ap requirements have all been met. duced a device in which the resistan means is hermetically sealed to the though the diaphragm itself acts this liquid. Thus it is observed phragm and the resistance-varying the one directly operates the oth each operates in the medium to whi adapted for the purposes of the The protecting and inclosing casin preserve the transmitter from sucl might cause it to leak, and thus b paired in its action, and also serve tain in contact with the diaphrag dium in which that diaphragm most operates. It is apparent that be electrical transmitter and liquid- casing there exists a mutual adap coöperation.

One feature of my invention is a p casing which is portable in natu adapted to be readily immersed in or withdrawn therefrom and may l in shallow water or in otherwise ir places. In fact it may be used unc cumstances in which the unprotecte have heretofore been used, while a time it presents many of the adva the shipboard arrangement speci forth in my aforesaid copending a It is adapted for use in connection wi craft and structures of all sorts, an larly for use at stationary signal-stations. I desire to have it understood, however, that other features of this application may be used without this form of casing—as, for example, in connection with a tank or casing against the wall of the ship, as described in my said copending application.

Having thus set forth the objects of my invention, I will now more specifically describe an embodiment of the same, reference being had to the accompanying drawings for an illustration thereof.

Figure 1 is a view in cross-sectional elevation of my apparatus in operative position. Fig. 2 is a cross-sectional view of the inclosing or protecting casing.

In the figures the casing is indicated by the reference-letter X. This casing is shown as a hollow sphere. A casing of such a shape has many advantages in actual use. It offers little resistance to moving water, and presenting a similar face in all directions is not likely to be turned or twisted on its support by tides and currents. Its supporting connections are therefore not likely to be injured. The casing is shown in three sections or segments, the central of which is indicated in the drawings at $x$ and is mounted upon the support or suspension $y$, which is shown as tubular for the passage of the receiving-wires. The point of junction of the segment and the tube $y$ is made water-tight in any suitable way. At the ends of the segment $x$ are provided internal annular flanges $x^3$ $x^4$. These flanges are each internally screw-threaded. The segments $x'$ and $x^2$ are shown as provided with internal annular flanges $x^5$ and $x^6$, respectively, and the flanges $x^5$ $x^6$ are so shaped and threaded as to be adapted to engage the threaded flanges $x^3$ and $x^4$ to complete the casing. When the segments are so engaged, they are adapted to fit closely and render the finished casing waterproof. As a further seal to the outside water a waterproof packing may be inserted between the opposing flanges. The casing when assembled and ready for use is entirely or partially filled with the liquid with which it is desired the transmitter be in contact.

The particular form of electric transmitter and the manner of its mounting is largely dependent upon the style of casing and other circumstances of each case, the points to be regarded in each instance being resistance-varying means sealed to the liquid with which the diaphragm is in contact. In the drawings I have shown within the casing the transmitter A, mounted in any suitable way, as by means of the extension $a'$. It may be of any suitable material, preferably glass or brass, and is shown in the form of a cylindrical shell $a$, having extending from one side an integral hollow neck $a'$. The shell provides a continuous cylindrical chamber $a^2$, open at both ends, and it has tl threads $a^3$ $a^4$, upon which the annul $a^5$ are arranged to be screwed. 1 serves to clamp the edge of a diaphi one end of the shell and the cap $a^6$ the edge of the diaphragm B' to the of the shell. The diaphragms and suitable packings for forming wa joints when the transmitter is tc merged, the diaphragms closing th the cylindrical chamber and formi tight ends thereto, the interior of t ber being preferably filled with air mospheric or any other desired press the drawings each diaphragm is re as having mounted upon it a means ing electrical resistance bearing oppc tion to each other and which may be to come into contact with each othe diaphragms are vibrated. This re be obtained in the original fitting of t mitters or may be secured by an a contactor mounted upon one to be a toward and from the other. Such a able contactor is afforded by mean screw C, mounted in the transmittei threaded hole therein and so that it i able to and from the transmitter C', sequently from and toward the tra $C^2$, whereby a contact between the t ters is secured and its degree varie contactor is useful where the carbon l mounted upon a diaphragm and has support and is as effective for a sing mitter as for multiple transmitters pla to back, as represented in the drawii where so employed one adjustable c serves for both transmitters. The trai C' comprises the diaphragm B', whicl by its edge, and means for varying e resistance, which is mounted upon an by the diaphragm. The transmitter $C^2$ same construction, and it will be nece specifically describe but one. While an for varying electrical resistance may ployed, I have shown a constructioi involves the use of a carbon button e ing the carbon plates $c$ $c'$ and the comr carbon $c^2$, held between them. Thes and the carbon are held in the chambe shell $c^4$. The shell is upon the inner the diaphragm B' and is attached the a central stud $c^5$, which passes throug in the diaphragm and receives a fasten $c^6$ upon its outer end, which screws the diaphragm and clamps it against upon the case. The case is closed b phragm of mica or other material $c^7$, at by a clamping-ring to the flange $c^8$ of tl This inner diaphragm has mounted u outer side in the chamber $a^2$ a metal l nut $c^9$, by which the carbon plate $c'$ is cl to the inner diaphragm $c^7$, the carbo having a threaded stud or screw which through a hole in the inner diaphragm and screws into the head or nut $c^9$. There is thus provided a carbon button or means for varying electrical resistance, which is carried solely by the main diaphragm and which is therefore vibrated by it. The inner diaphragm and the nut or head $c^9$, which it carries, provide so much inertia to be overcome by the vibrations that it establishes what might be called an "accordion-actuating effect" upon the means for varying electrical resistance, doing away with the limitations which would be imposed were the nut or head $c^9$ rigidly secured to the shell $c^7$ and providing the carbon-holder with a life and action which it is desirable that it should have for producing the best electrical action when vibrated by the main diaphragm. This effect is heightened when the transmitter may come into contact with an abutment—such, for instance, as that established by the contactor C with an opposing surface. As the transmitter $C^2$ is of a similar structure and as it bears opposed relation to the transmitter C', it will be seen that not only does each transmitter have the accordion action which I have mentioned, but two transmitters together have an additional accordion movement with relation to each other due to the vibrations of each transmitter, which also adds to the liveliness of the carbon button and the value and effectiveness of the transmitter. There are thus in the transmitter shown in the figures three accordion effects obtained, one individual to each transmitter and one in which both transmitters join.

The transmitters may be connected either in series or in multiple, and the two parts or branches of the receiver or either of them may be connected with the transmitters either in series or in multiple. In the figures the transmitters and receiver are shown connected in one series through the cups $c^8$ and the contactors C $c^9$. The circuit may be traced as follows: by one of the conducting-wires to one of the contactors $c^9$, through the corresponding transmitter $c^2$ and cup $c^8$ to diaphragm B', then by way of casing $a$ to the diaphragm B, and through the other transmitter to the other contactor and wire. I prefer to use a primary circuit and dispense with the use of induction-coils, and thus do away with loss of electric energy in transformation. Of course the wires wherever they pass through water are insulated by any desirable means, and I have shown them as passing from the chamber $a^2$ through the hole in the neck $a'$ and also through the insulating sleeve or extension G, which is attached to the neck. From the sleeve G the wires pass to the receivers F and the battery D.

The diaphragms of the transmitters may be tuned to the dominant tone of the bell used in producing the sound signals or impulses or of any other signal-producing means. Each diaphragm may be so tuned and may t brought into unison with each other. means of accomplishing this tuning of t phragm is by varying its thickness. A1 way is by changing the pressure upon Whereas I have shown and describe spherical casing as water-tight, it nee for all purposes be so. In fact, I may cially provide openings therein for th circulation of the outer water, such as ; at $e$ in the slightly-modified structure o 2. In such instances it is not possil maintain all the advantages hereinbefore tioned inherent to the water-tight casin; the casing is still an effective protection receiver against injury, and the transm medium of course remains continuous.

Having thus fully described my inve I claim and desire to secure by Letters I of the United States—

1. An electric sound-transmitting $c$ comprising a shell or case adapted to re and transmit sound-vibrations, an el sound-transmitter contained in the sh case and electrically connected with ceiver, and an incompressible fluid me contained in the shell or case.

2. An electric sound-transmitting $c$ comprising a shell or case adapted to re and transmit sound-vibrations, an el sound-transmitter contained in the sh case electrically connected with a receive having a diaphragm within the shell, a incompressible fluid medium contained shell between it and the diaphragm.

3. A sound-transmitting device compr a shell or case adapted to receive and tra sound-vibrations, an electric sound-tran ter contained in said shell or case, said tric transmitter comprising a water-chamber, a vibratory diaphragm closing same, electrical-resistance-varying n within said chamber and in operative rel to said diaphragm, and an incompressible medium between said diaphragm and the of said shell or casing and in contact t with.

4. An electric sound-transmitting devic submarine signaling comprising a shell or adapted to receive and transmit sound v tions transmitted to it by water, an ele sound-transmitter contained in the she case and electrically connected with a rece and a fluid medium in the shell or case ; lar to that by which the shell or case is rounded and from which it receives so vibrations.

5. An electric sound-transmitting devic submarine signaling comprising a shell or adapted to receive and transmit sound-v tions transmitted to it by water, an ele sound-transmitter contained in the shell or and having vertically-disposed diaphra facing in two directions, which transmitt electrically connected with a receiver, and an incompressible, fluid medium contained in the shell or case and with which the diaphragms are in contact.

6. An electric sound-transmitting device for submarine signaling comprising a shell or case adapted to receive and transmit sound-vibrations transferred to it by water, an electric sound-transmitter contained in the shell or case and electrically connected with a receiver, and an incompressible, non-corrosive, fluid medium contained in the shell or case.

7. An electric sound-transmitting device for submarine signaling comprising a shell or case adapted to receive and transmit sound-vibrations transferred by water, an electric sound-transmitter contained in the shell or case and electrically connected with a receiver, and an incompressible, fluid medium contained in the shell or case and automatically changeable as to density to conform to the density of the enveloping water.

8. An electric sound-transmitting device for submarine signaling comprising a shell or case adapted to receive and transmit sound-vibrations transferred by water to it, an electric sound-transmitter contained in the shell or case and electrically connected with a receiver, and means connecting the chamber of the shell with the outer water whereby it is caused to be filled with water of the same density as that of the water surrounding it.

9. A sound-transmitter having a number of diaphragms, means for varying electrical resistance mounted upon each, the mountings of said means being adapted to have a vibratory contact with each other.

10. In a sound-transmitter, a number of vibratory diaphragms, means for varying electrical resistance mounted upon each, the mountings of said means being adapted to have a vibratory contact with each other, and means for adjusting their contact relation.

11. In a transmitter for submarine telephony, a case or shell having two openings on vertical planes in line with each other, a vibratory diaphragm at each opening attached to the case, a means for varying electrical resistance supported by each diaphragm contained in a water-tight chamber and having a vibratory contact with each other, a receiver and means for connecting the transmitter electrically with the receiver.

12. A sound-transmitter having a diaphragm, means for varying electrical resistance mounted thereon and supported thereby, and an abutment lying in the path of vibration of said means, adapted to make and break contact therewith upon an operation of the transmitter.

13. A sound-transmitter having a plurality of diaphragms, mounted to simultaneously receive the impact of sound-waves, a plurality of electrical-resistance-varying means mounted thereon and having independent ac means whereby the operation of one resistance-varying means modifies the tion of another of said means.

14. A sound-transmitter having a p of diaphragms, mounted to simultaneo ceive the impact of sound-waves, a p of electrical-resistance-varying means ed thereon, and means whereby the or of one of said resistance-varying mean fies the operation of another of said said resistance-varying means being c ed in series with each other.

15. A sound-transmitter having a p of diaphragms, mounted to simultaneo ceive the impact of sound-waves, a p of electrical-resistance-varying means ed thereon and supported thereby, and whereby the operation of one of said ance-varying means modifies the oper: another of said means.

16. A transmitter for submarine tel comprising a shell or case having two openings, a vibratory diaphragm closi of said openings and forming a wate wall to the chamber of the shell, a me varying electrical resistance for each vibratory diaphragms contained in the tight chamber, each of said means in op relation to its respective diaphragm, whereby the operation of one of said ance-varying means modifies the opera another of said means, a receiver, and tric circuit connecting the transmitte the receiver.

17. In a transmitter for submarine ony a case or shell having two openin a vibratory diaphragm to close each of attached to the shell and forming a proof wall thereto, the outer surface of is in contact with the water, a means rying electrical resistance for each diap in the water-tight chamber, a receive an electric circuit connecting the trans in series with each other and with the re 18. In a transmitter for submarine ony, a case or shell of non-corrosive rial, cylindrical in form, having a cent low neck and two openings on vertical in line with each other, a vibratory diap at each opening, caps for attaching th phragms to the case or shell, a means : rying electrical resistance for each diap in operative conjunction therewith, a re and an electric circuit between the trans and the receiver.

19. In a sound-transmitter, a diap resistance-varying means supported th and operating during vibration of th phragm by virtue of its own inertia, ir bination with additional means for ope said resistance-varying means at interv intermittently during such vibration.

20. In a sound-transmitter, a diapl resistance-varying means supported thereby and operating during vibration by virtue of its own inertia, in combination with additional means arranged to operate said resistance-varying means only upon vibration of certain amplitude.

21. In a sound-transmitter, a diaphragm and resistance-varying means supported thereby, means for varying said resistance, fu[rther] means for varying said resistance, said [last] named means operating only upon vib[ration] of a certain amplitude.

ARTHUR J. MUNL[...]

Witnesses:
F. F. RAYMOND, 2d,
J. M. DOLAN.